J. E. CARTER.
NON-FREEZING HYDRANT.
No. 83,602. Patented Nov. 3, 1868.
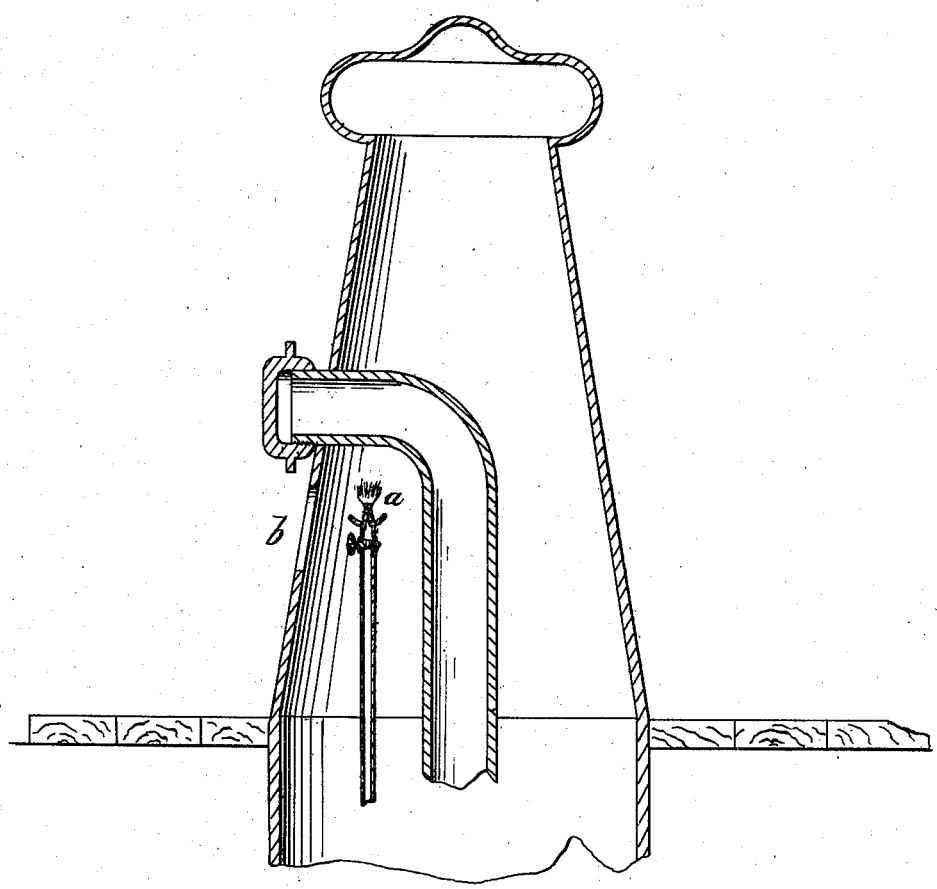
Witnesses:
Henry T. Carter
Frank W. Libby
Inventor:
Jas. E. Carter

JAMES E. CARTER, OF PORTLAND, MAINE.

*Letters Patent No. 83,602, dated November 3, 1868.*

IMPROVEMENT IN NON-FREEZING HYDRANTS.

The Schedule referred to in these Letters Patent and making part of the same.

*To all whom it may concern:*

Be it known that I, JAMES E. CARTER, of Portland, county of Cumberland, and State of Maine, have invented a new and useful Method of Preventing Hydrants from Freezing; and I do hereby declare the following to be a full, clear, and exact description of the same, reference being had to the accompanying drawing, forming a part of this specification, in which is represented a sectional elevation of a hydrant with my invention attached.

My invention is intended to be attached to city-hydrants of the ordinary construction, and prevent them from freezing. It consists of a gas-pipe leading from the "street-mains," to which is attached a burner, $a$, of any known construction.

It is intended to place the hydrants under the charge of the police, who will use their discretion when to light the gas and when to turn it off, a door or aperture, $b$, being cut in the shell of the hydrant for that purpose.

I do not claim a gas-jet; neither do I claim heating water or any substance by the use of a flame of gas; neither do I claim supplying the jet from the city-mains; but my invention relates to an improved and more useful hydrant and one not subject to the accident of freezing. I do not claim lamp or gas-jets when applied to tubes in any position, nor for heating or culinary purposes; neither do I claim the application of lamp or gas-jets for any of the purposes to which they have been heretofore applied; but my invention relates to an improved hydrant alone in which the gas and water-tubes are brought up in the same shell or envelope, so that they are prevented from freezing under the ground, by being located below the reach of the frost or cold, and are also rendered free from the liability to freeze above the ground, or in the shell or stock of the hydrant, by the protection of the shell or case, and by the burning of the gas-jet located and arranged as herein described. It is my purpose to limit my application to the arrangement and combination, in a hydrant, of the devices or parts described.

What I claim as my invention, and desire to secure by Letters Patent, is—

The improved hydrant, having the gas and water-pipes combined and arranged within the shell or stock of the same, from their respective mains upward, as and for the purposes set forth.

JAS. E. CARTER.

Witnesses:
HENRY T. CARTER,
FRANK W. LIBBY.